US006775890B2

(12) United States Patent
Kolarik

(10) Patent No.: US 6,775,890 B2
(45) Date of Patent: Aug. 17, 2004

(54) APPARATUS FOR URGING TWO MEMBERS APART OR TOGETHER

(76) Inventor: Frank Kolarik, 415 Poplar Run Rd., Normalville, PA (US) 15469

( * ) Notice: Subject to any disclaimer, the term of this patent is extended or adjusted under 35 U.S.C. 154(b) by 0 days.

(21) Appl. No.: 09/963,128

(22) Filed: Sep. 24, 2001

(65) Prior Publication Data

US 2002/0101017 A1 Aug. 1, 2002

Related U.S. Application Data

(60) Provisional application No. 60/235,392, filed on Sep. 25, 2000.

(51) Int. Cl.7 ................................................ B23P 19/02

(52) U.S. Cl. ............................ 29/235; 29/263; 29/255; 29/244; 29/256; 29/282; 285/23; 285/39; 285/114; 285/18

(58) Field of Search ............................ 285/114, 23, 39, 285/18; 29/272, 271, 464, 525, 525.01, 434, 255, 235, 243.5, 700, 402, 890.08, 33 D, 33 T, 726.5, 234, 237, 244, 280, 256, 263, 282, 426.5, 525.02; 138/155; 248/74.1

(56) References Cited

U.S. PATENT DOCUMENTS 889,315 A * 6/1908 Kenyon ....................... 29/256
2,344,939 A 3/1944 Bennett
2,514,374 A * 7/1950 Cooper ....................... 254/100
3,252,192 A 5/1966 Smith
3,653,115 A 4/1972 Perkins
4,584,754 A * 4/1986 Bagoly ........................ 29/268
4,635,970 A * 1/1987 Haines ....................... 285/114
4,769,889 A * 9/1988 Landman et al. ............. 29/237
5,052,608 A * 10/1991 McClure .................... 228/44.5
D329,891 S 9/1992 Sievers
5,161,828 A 11/1992 Hynes et al.
5,580,102 A 12/1996 Stultz
6,467,811 B2 * 10/2002 Mitchell ...................... 285/15

* cited by examiner

*Primary Examiner*—Peter Vo
*Assistant Examiner*—Stephen Kenny
(74) *Attorney, Agent, or Firm*—Webb Ziesenhiem Logsdon Orkin & Hanson, P.C.

(57) ABSTRACT

An apparatus for urging two members apart or together that includes a first clamp adapted to be received by a first piece, a second clamp adapted to be received by a second piece and a plurality of power screws coacting with the first clamp and the second clamp, whereby moving the power screws in a first direction causes the first clamp to move relative to the second clamp and the first piece to move relative to the second piece. The present invention is suited for separating muffler pipes.

13 Claims, 5 Drawing Sheets

APPARATUS FOR URGING TWO MEMBERS APART OR TOGETHER

CROSS-REFERENCE TO RELATED APPLICATION

This application claims the benefit of U.S. Provisional Application Serial No. 60/235,392, filed Sep. 25, 2000, which is hereby incorporated by reference in its entirety.

BACKGROUND OF THE INVENTION

1. Field of the Invention

This invention relates to an apparatus for urging two members apart or together.

2. Description of the Prior Art

While the subject invention may have many applications, the apparatus may be used to separate two muffler pipes. In the past, the effort required to separate two muffler pipes was great and, as a result, typically one or both of the muffler pipes were destroyed and subsequently replaced. The pipes typically were crimped together. Hence, generally, the pipes were treated as an integral unit and discarded when one of the pipes needed replaced. In other instances, the pipes were physically destroyed to separate and then required total replacement. The Applicant realized that in many instances it was not necessary to destroy the muffler and that it was desirable to physically separate these pipes and retain or reuse at least one of the muffler pipes.

Therefore, an apparatus is needed to nondestructibly separate two attached members without destroying them.

BRIEF SUMMARY OF THE INVENTION

The present invention is a device for moving a first piece relative to the second piece that includes a first clamp adapted to be received by a first piece; a second clamp adapted to be received by a second piece; and a moving member coacting with the first clamp and the second clamp. In operation, moving the moving member in a first direction causes the first clamp to move relative to the second clamp causing the first piece to move relative to the second piece.

The present invention is also a method for removing a first piece joined to a second piece, whereby the first piece is frictionally secured to the second piece. The method includes the steps of providing a first clamp, securing the first clamp to the first piece, providing a second clamp, securing the second clamp to the second piece, coacting a moving member with the first clamp and the second clamp and moving the moving member, thereby causing the first clamp to move relative to the second clamp and, in turn, causing the first piece and the second piece to move relative to each other.

DETAILED DESCRIPTION OF THE INVENTION

Figure 1:
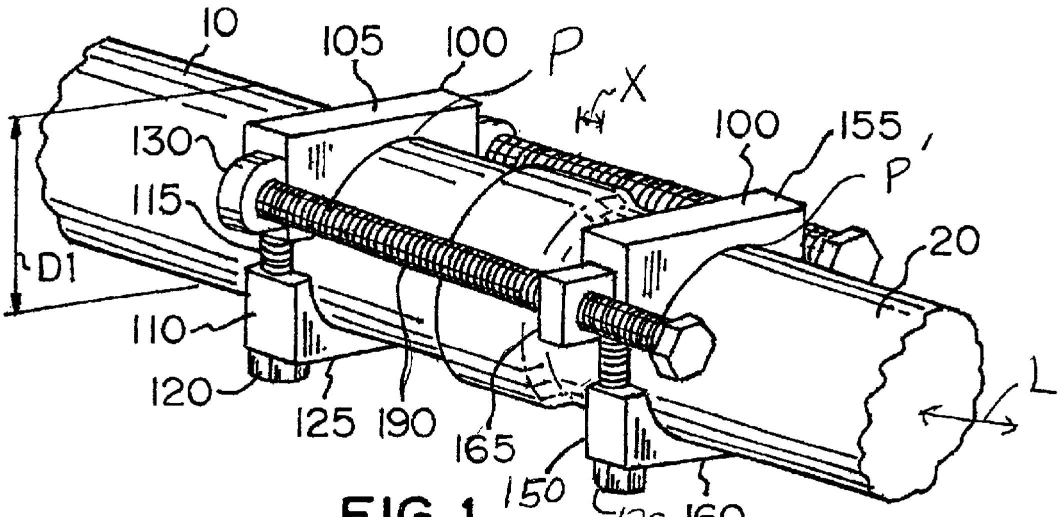
FIG. 1 is an isometric view of a first embodiment of the subject invention.

While the subject invention may be directed to the joining or separating of any two members for purposes of this discussion, two adjoining pipes 10 and 20 in a muffler system as illustrated in FIG. 1 will be discussed.

Figure 2:
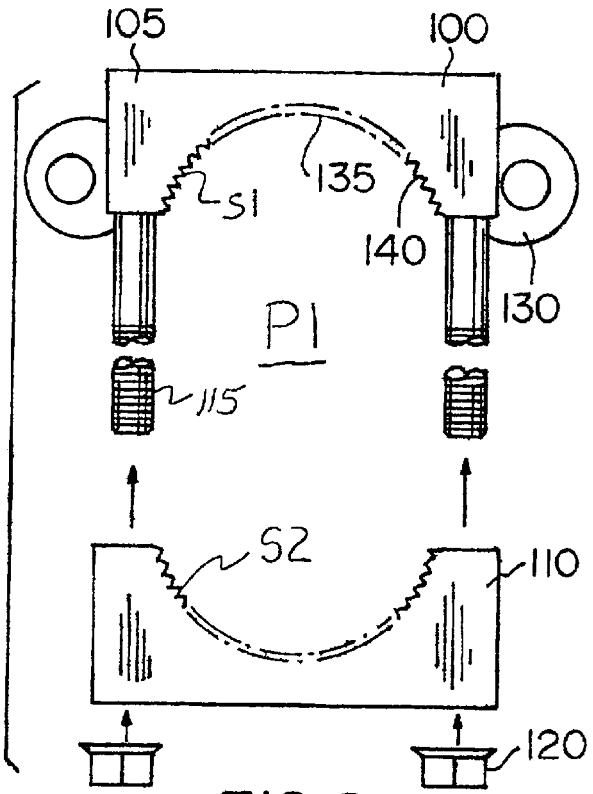
FIG. 2 is an exploded elevational view of a first clamp in FIG. 1.

Directing attention to FIGS. 1 and 2, a pipe 10 having a diameter D1 is part of a muffler system frictionally fit within a pipe 20 having an inner diameter which accepts the first pipe 10. The pipe 20 may also be crimped to pipe 10. In other words, the pipe 10 is joined to pipe 20, yet not permanently joined via welding, soldering, gluing or the like. Over time, these pipes become frictionally engaged such that separation may be very difficult. To promote separation of the two pipes 10, 20, a first clamp 100 is secured to the first pipe 10 and a second clamp 150 is secured to the second pipe 20. Clamp 100 includes a top half 105 and a bottom half 110 which are secured to one another by a bolt 115 attached to the top half 105 and extending, through a bore within the bottom half 110 such that a nut 120 may be secured to the bolt 115 on the underside 125 of the bottom half 110. This arrangement exists on both sides of the clamping member 100, thereby providing a symmetric clamping action. Hence, only one bolt 115 is shown.

Bumpoff lugs 130 protrude from the top half 105 and may have indentations therein to promote engagement with a power screw 190. The second clamping member 150 has a top half 155 and a bottom half 160 and engages the second pipe 20 in a manner similar to that of the first clamp 100. Threaded lugs or tabs 165 extend from the top half 155. Respective power screws 190 are threaded into the threaded lugs 165, until each contacts a corresponding bumpoff lug 130. At that point, the power screw 190 is further urged against the bumpoff lug 130, thereby separating the first pipe 10 from the second pipe 20.

Directing attention to FIG. 2, the first clamp 100 engages the first member along the outer diameter of the first member and such engagement may be further enhanced by teeth 135 along the surface 140 which engages the first pipe 10. This same feature may also exist on the bottom half 110 of the first clamp 100.

Figure 3:
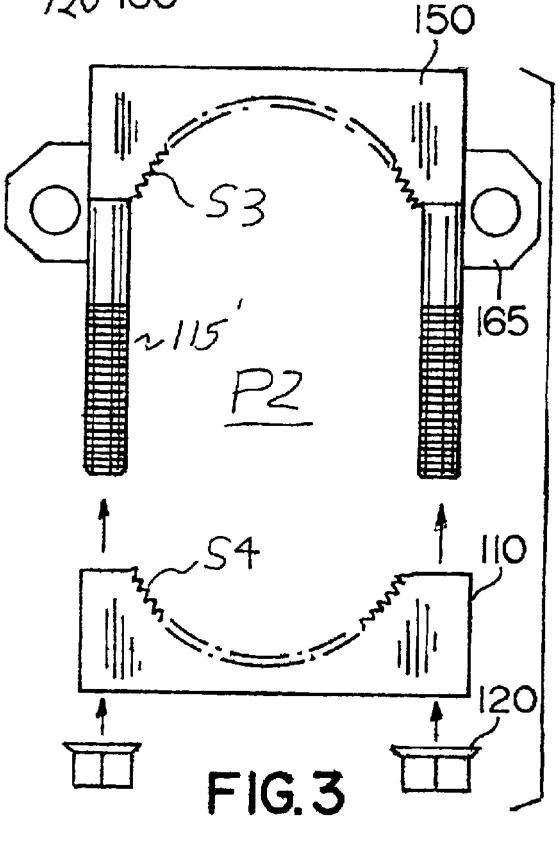
FIG. 3 is an exploded elevational view of a second clamp in FIG. 1.

FIG. 3 illustrates details of the second clamp 150 which are essentially identical to clamp 100 with the exception of the threaded lug 165 which differs from the bumpoff lug 130 and which was previously discussed.

Figure 4:
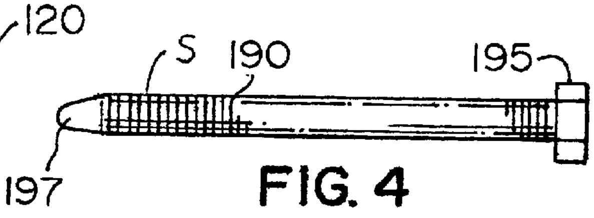
FIG. 4 is a plan view of a bolt shown in FIG. 1.

FIG. 4 illustrates the power screw 190 which includes a hex head 195 at one end and which has a tapered end 197 to promote feeding within a bore.

Figure 5:
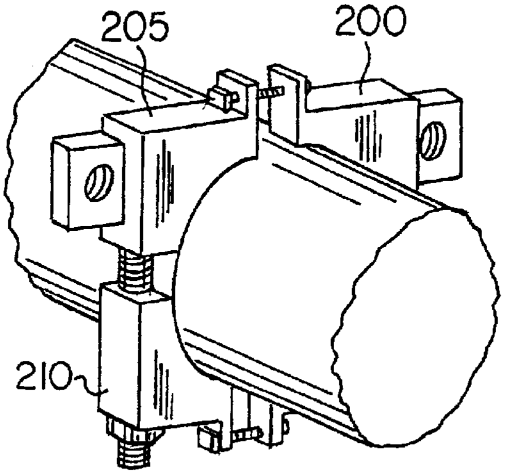
FIG. 5 is an isometric view of another embodiment made in accordance with the present invention.
Figure 6:
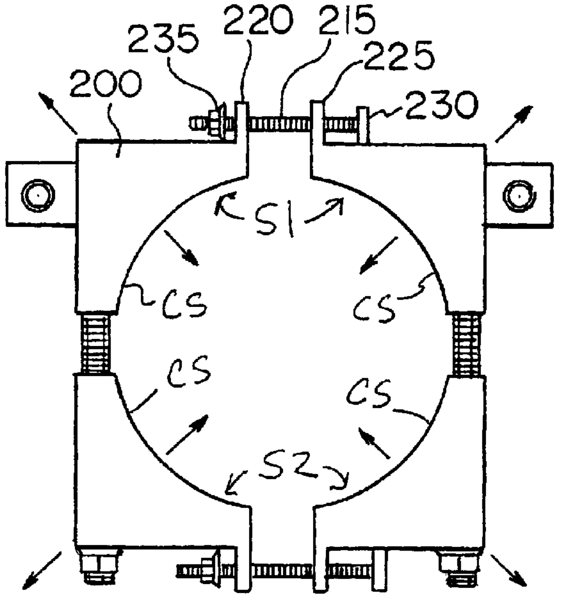
FIG. 6 is a front elevational view of the clamp shown in FIG. 5.

FIGS. 5 and 6 illustrate another embodiment of the present invention whereby either or both of the clamps 100, 150 illustrated in FIG. 1 may be modified. In particular, to accommodate a wide variety of diameters, a clamp 200 may have a top half 205 and a bottom half 210 whereby each half may be split and its width adjusted by an adjusting screw 215 which engages two adjustment ears 220, 225 and compresses them between the adjusting screw head 230 and adjusting screw nut 235.

Figure 7:
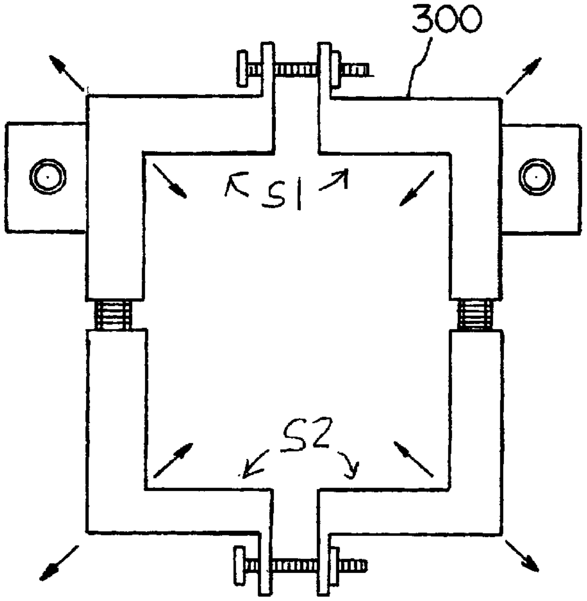
FIG. 7 is a front elevational view of a clamp similar to that shown in FIG. 6, however, designed to accommodate different geometries.

FIG. 7 shows a clamp 300, which is a similar arrangement to that illustrated in FIG. 6 with the exception that the clamp 200 in FIG. 6 would ideally accommodate a pipe having a cylindrical cross section while the clamp 300 in FIG. 7 could accommodate a pipe having a circular cross section or a pipe having a variety of different shapes such as square, octagonal or oval.

Figure 8:
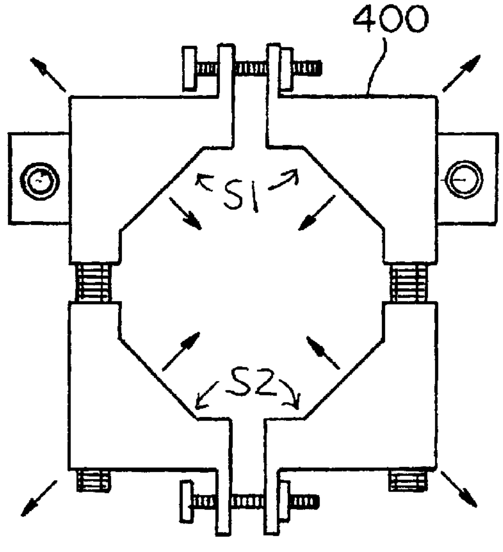
FIG. 8 is a front elevational view of a clamp similar to that illustrated in FIG. 6 designed to accept different geometries.

FIG. 8 illustrates clamp 400 similar to that shown in FIGS. 6 and 7 with the exception that the clamping surface now has been modified again to accommodate pipes having different shapes. It should be appreciated that the clamping surfaces in FIGS. 6, 7, and 8 may all be used to clamp a circular pipe; however, each of these clamping surfaces may be better suited to clamp a specific geometry better than the other clamping surfaces.

Figure 9:
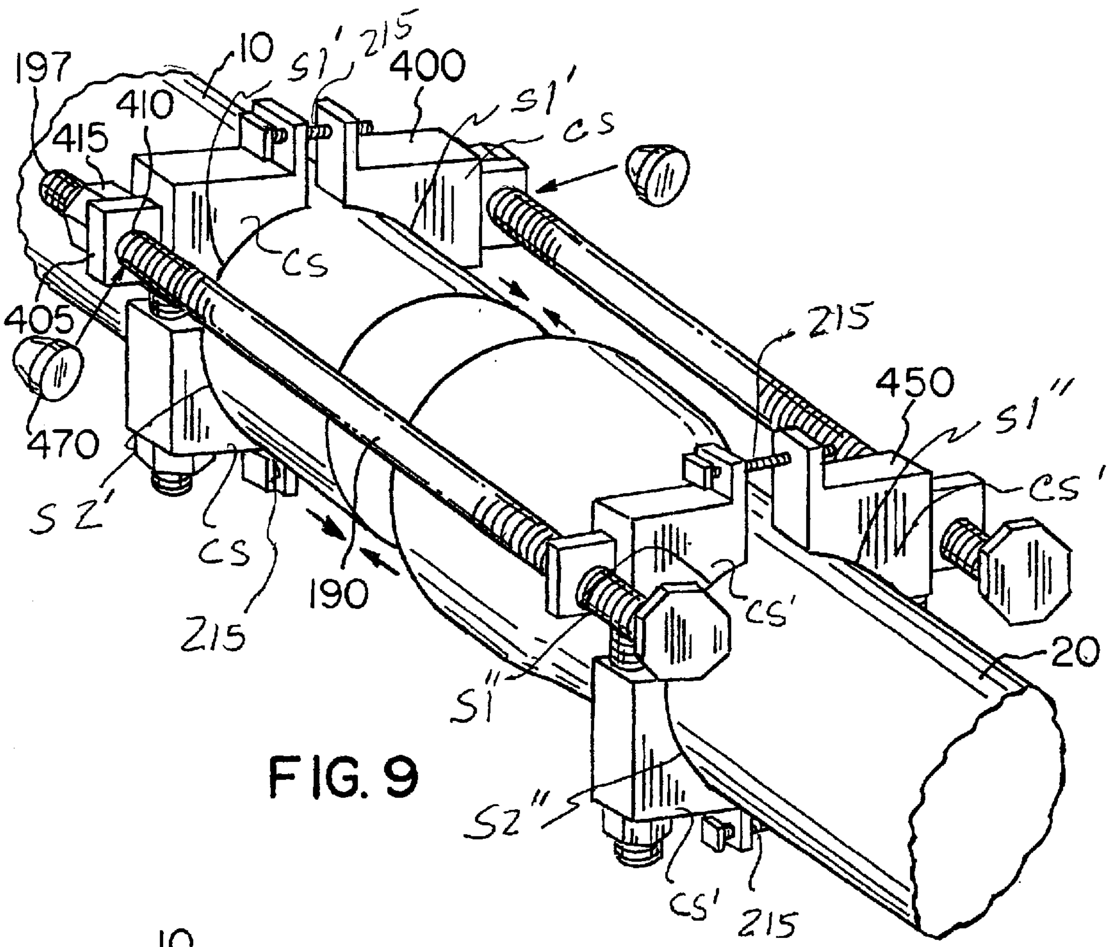
FIG. 9 is an isometric view of another embodiment of the present invention.

FIG. 9 illustrates an isometric view of another embodiment of the subject invention. Specifically, FIG. 9 shows a clamp 400 that is similar to that clamp disclosed in FIG. 8 with the exception that a lug 405 of the clamp 400 has a bore 410 larger than the other diameter of the power screw 190 and a nut 415 on the opposite side of the lug is engaged upon the power screw 190 such that the first pipe 10 and the second pipe 20 may be urged together by tightening the power screw 190, thereby urging clamp 400 toward clamp 450 and subsequently urging the first pipe 10 against the second pipe 20. Specifically, the power screws 190 are tightened so that the hex heads 195 abut against the lugs 165. Continued rotation of the screws 190 causes the clamp 400 and first pipe 10 to be urged toward clamp 400 and second pipe 10.

In order to separate the first pipe 10 from the second pipe 20, the nut 415 is removed from the power screw 190 and the power screw 190 is retracted from the lug bore 410. Bumpoff inserts 470 are inserted within the bores 410 such that now, when the power screw 190 is advanced, the end 197 abuts against the bumpoff insert 470 and urges the clamp 400 away from clamp 450, thereby separating the first pipe 10 from the second pipe 20. The nut 415 may be permanently affixed, such as by welding to the lug 405 or lug bore 410 may be threaded to accept the threads from the power screw 190.

Figure 10:
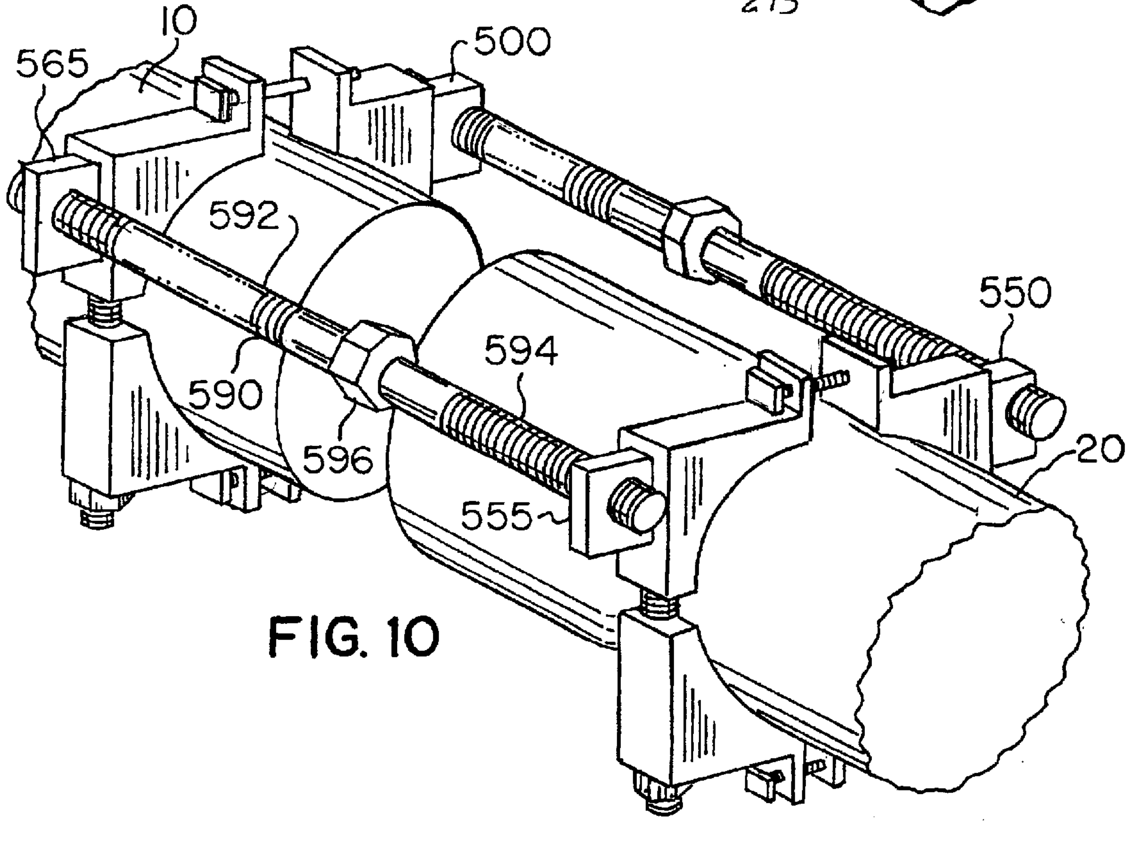
FIG. 10 is an isometric view of another embodiment of the present invention.

FIG. 10 illustrates an alternate arrangement whereby a clamp 500 has threaded lugs 505 and a clamp 550 has threaded lugs 555. A power screw 590 has reverse threads 592, 594 which engage the threaded lugs 505, 555. An arrangement for power screw 590, such as nut 596, is secured to the power screw 590 whereby rotation of the power screw 590 in one direction urges the first pipe 10 toward the second pipe 20, and rotation in a second direction urges the pipe 10 away from the pipe 20.

Figure 11:
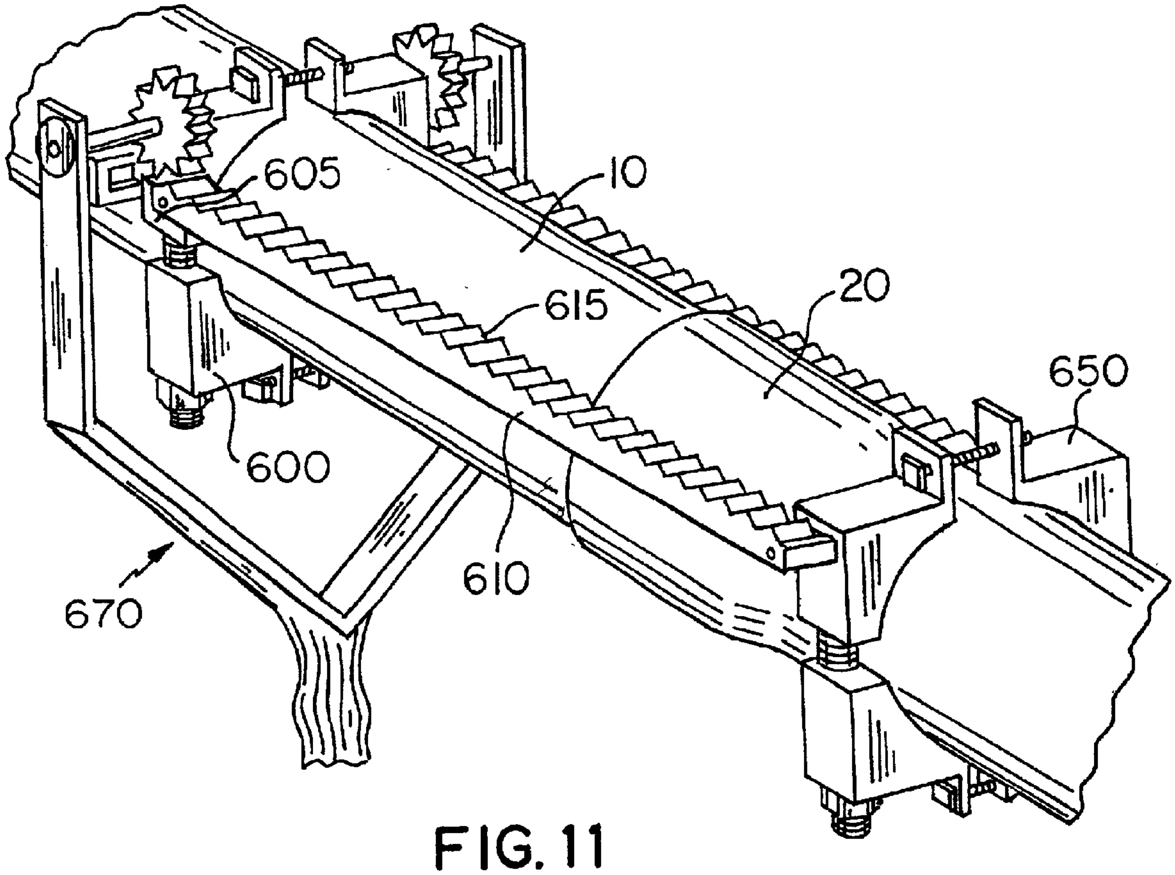
FIG. 11 is an isometric view of another embodiment of the present invention.

FIG. 11 illustrates an embodiment whereby clamp 600 has attached to its upper half 605 a rack 610 having gear teeth 615. The rack 610 extends and is engaged with the second clamp 650. A pinion 620 is rotatably attached to the upper half 605 and may be rotated to move the rack 610 back and forth, thereby moving the first pipe 10 toward or away from the second pipe 20. As illustrated in FIG. 11, a ratcheting mechanism 670 is used to rotate the pinion 620. Such a ratcheting mechanism is known to those skilled in the art of mechanical tools and, therefore, additional information on this will not be provided.

Figure 12:
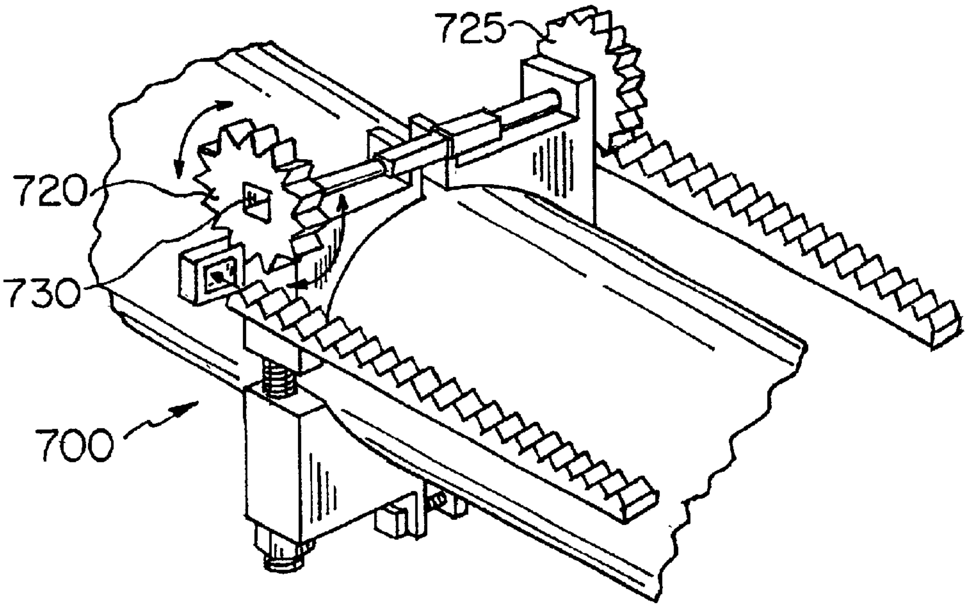
FIG. 12 is an isometric view of another embodiment of the present invention.

FIG. 12 illustrates an arrangement similar to that in FIG. 11. However, now a clamp 700 has a pinion 720 which is rotatably engaged with an opposing pinion 725 on the opposite side of the clamp 700. Pinion 720 has a recess 730 that may accept a square tool such that rotation of the tool will rotate the pinion 720, thereby rotating the pinion 725 concurrently. It should be noted that the shape of the recess 730 may be suited to accept any type of tool.

Figure 13:
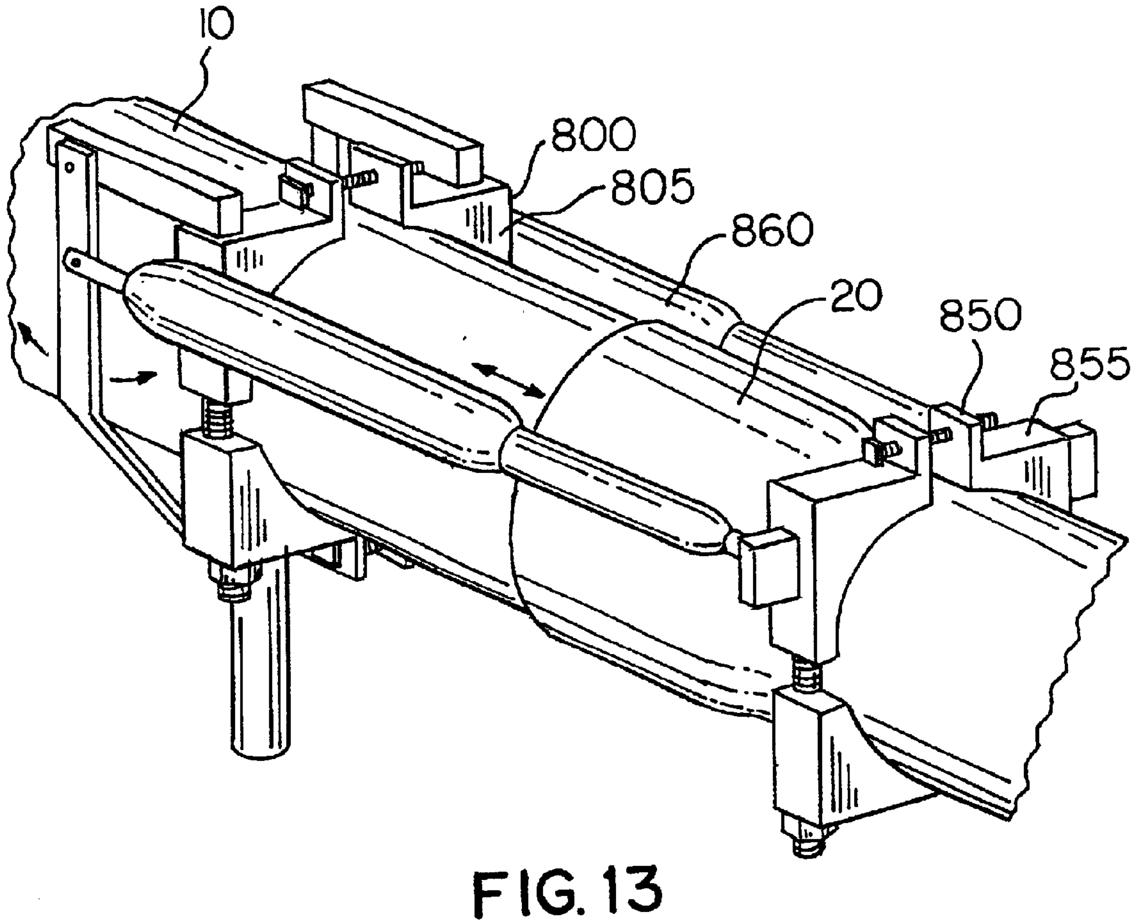
FIG. 13 is an isometric view of another embodiment of the present invention.

FIG. 13 illustrates an arrangement where an upper half 805 of clamp 800 and the upper half 855 of a clamp 850 are attached to one another through a hydraulic cylinder 860 which may act to draw the first pipe 10 toward the second pipe 20, or separate first pipe 10 from second pipe 20.

It should be noted that in each embodiment there are lugs on each side of the clamps and these lugs are identical to opposing lugs on the opposite side of the clamp.

More specifically, the present invention is an apparatus or device removing a first piece or pipe 10 relative to a second piece or pipe 20. Referring again to FIGS. 1–4, the present invention includes the first clamp 100 adapted to be received by the first piece 10. The second clamp 150 is provided and is adapted to be received by the second piece 20. A moving member or power screw 190 coacts with the first clamp 100 and the second clamp 200, whereby moving the moving member 190 in a first direction causes the first clamp 100 to move relative to the second clamp 200, thereby causing the first piece 10 to separate or move toward a second piece 20.

The first clamp 100 includes a first clamp section or top half 105 removably secured to a second clamp section or bottom half 110. The first clamp section 105 has a first surface S1 and a second clamp section has a second surface S2. The first surface S1 and the second surface S2 are adapted to coact with the first piece 10. The second clamp 150 includes a third clamp section or top half 155 having a third surface S3 and a fourth clamp section or bottom half 160 having a fourth surface S4 adapted to coact with the second piece 20. At least one first fastener or bolt 115 is removably fastened to the first clamp section 105 and to the second clamp section 110. At least one second fastener or bolt 115' removably fastens the third clamp section 155 to the fourth clamp section 160. Preferably, two first fasteners 115 and two second fasteners 115' are used and positioned on opposite sides of the respective clamps 100 and 150. Although bumpoff lugs 130 are provided on opposite sides of the first clamp section 105 and threaded lugs 165 are provided on corresponding opposite sides of the third clamp section 155, one of the bumpoff lugs 130 may be provided on the second section 110 and a corresponding threaded lug 165 may be provided on the fourth section 160 on an opposite side of the clamps 100 and 150 from the corresponding bumpoff lugs 130 and threaded lug 165 on respective sections 105 and 155. Also, top halves 105 and 155 can have threaded holes on opposite sides to receive threaded fasteners with heads in lieu of bolts 115 and 115' and nuts 120. The first surface S1 and the second surface S2 define a portion of a first passageway P1 for receipt of the first piece 10, and the third surface S3 and the fourth surface S4 define a portion of a second passageway P2 for receipt of the second piece. The first clamp section 105 is spaced a distance from the second clamp section 110 and the bolts 115 and nuts 120 coact with the first clamp section 105 and second clamp section 110. Adjusting the bolts 115 and nuts 120 (i.e., the first fasteners) adjust a profile P of the first passageway P1. The third clamp section 155 is spaced apart from the fourth clamp section 160 and the bolts 115' and nuts 120 coact with the third clamp section 155 and the fourth section 160 whereby adjusting the bolts 115' and nuts 120 (i.e., the second fasteners) adjust a profile P' of the second passageway P2.

The first surface S1, second surface S2, third surface S3, and the fourth surface S4, etc., may form geometric shapes. Those geometric shapes can be arcuate or include a plurality of straight lines such as shown in FIGS. 2, 3, 6, 7, and 8. Preferably, at least the first surface S1 and the second surface S2 include gripping members 135, such as teeth.

At least one of the first clamp section 105 and second clamp section 110 includes a moving member contact surface, such as a bumpoff lug 130, and at least one of the third section 155 and fourth section 160 includes a receiving portion, such as a threaded lug 165. Preferably, the moving member is a power screw 190 and is a threaded member with a contact end 197, ax threaded shaft S, and a head 195. The receiving portion 165 includes a threaded surface for threadably receiving the threaded shaft S and the contact end 197 contacts the contact surface or bumpoff lug 130. Preferably, the contact surface 130 is a lug and the receiving portion 165 includes a depending tab having a threaded hole defined therein.

Alternatively, the first clamp 100 can include a plurality of clamp sections CS removably secured to each other, such as shown in FIGS. 5–13, each of the first clamp sections include first clamp section surfaces S1' and S2' defining portions of the first passageway for receipt of the first piece. The second clamp 150 can include a plurality of clamp sections CS' removably secured to each other, each of the second clamp sections CS' includes second clamp section surfaces S1" and S2" defining portions of the second passageway for receipt of the second joined piece 20. The first clamp sections CS are removably secured to each other via threaded members or adjusting screws 215 and the second clamp sections CS' are removably secured to each other via threaded members or adjusting screws 215. Preferably, the first clamp 100 includes four clamp sections and the second clamp 150 includes four clamp sections. Each of the clamp sections has surfaces contacting one of the first piece 10 and the second piece 20. The clamp sections surfaces can be curved or can include straight surfaces. The passageways can be substantially arcuate in shape, such as a circle, or polygonal in shape, such as square or hexagon.

As shown in FIGS. 9 and 10, at least one of the first clamp 100, first clamp section 105, and second clamp section 110 can include a first moving member receiving portion, such as a threaded lug 565, and at least the second clamp 150, the third clamp section 155, and fourth clamp section 160 can include a second moving member receiving portion, such as a threaded lug 555, whereby the moving member is threaded and threadably received by the first moving member receiving portion and second moving member receiving portion. As seen in FIG. 9, a plug 470 can be received by the first moving member whereby an end of the moving member contacts a contacting surface of the plug 470. A driving member or nut (such as nut 596 or hex head 195) may be provided on the moving member on either an end of the moving member, as in a hex head, or intermediate the first clamp 100 and second clamp 150.

The moving member can include a rack 610 and the device can further include a pinion 620 secured to one of the first clamp and the second clamp for coacting with the rack 610, whereby rotation of the pinion 620 in a first direction, such as clockwise or counterclockwise, causes the rack 610 to move in a first longitudinal direction and rotating the pinion 620 in an opposite direction causes the rack 610 to move in a second longitudinal direction. This arrangement can further include a pawl and ratchet coacting with the pinion 620 to permit rotation only in one direction. A handle can also be provided with the pinion.

Also, a hydraulic cylinder 860 can be provided having one end secured to the first clamp 100 and a second end pivotally secured to a handle whereby the handle is pivotally secured to the second clamp 150.

The present invention can be used for removing a first piece 10 pressed against the second piece 20. The first piece 10 is frictionally secured to the second piece 20 and the method includes the steps of providing a first clamp 100; securing the first clamp 100 to the first piece 10; providing a second clamp 150; securing a second clamp 150 to second piece 20; coacting the moving member with the first clamp 100 and the second clamp 150; moving the member, thereby causing the first clamp 100 and the second clamp 150 to move relative to each other and, in turn, causing the first piece 10 and second piece 20 to move relative to each other. The joined pieces can include pipes such as those used in forming a muffler system. Further, the pipes can be joined via crimping.

More specifically, at least referring to FIGS. 1–4, the top half 105 is placed on the pipe 10 and the bottom half 110 is placed on the pipe 10 so that bolts 115 are received by respective holes defined on the bottom half 110. The nuts are threadably received by the bolts 115 and tightened so that the surfaces S1 and S2 frictionally engage into the pipe, and the clamp 100 cannot move along a longitudinal direction L relative to the pipe 10. Then, the top half 155 and the bottom half 160 are secured to the pipe 20 in the same manner as the top half 105 and the bottom half 110 are secured to the pipe 10, so that the clamp 150 cannot move in the longitudinal direction relative to the pipe 20. When assembled, the threaded lugs 165 are aligned with the bumpoff lugs 130. The shafts S of the power screws 190 are received or threaded, say in a clockwise direction, by the threaded lugs 165 until the tapered ends 147 abut the bumpoff lugs 130. Then, a wrench or other tool adapted to receive hex head 195 is used and received by one of the hex heads 95. The wrench is then rotated in the clockwise direction so that the power screw 190 moves a distance X, say 1/16 inch. Then, the wrench is used on the opposite hex head 195 and the same procedure is repeated. Then, the user repeats this process with both power screws 190 until the pipes 10 and 20 are separated. Then the clamps 100 and 200 are removed from the pipes. As should be evident the clamps 100 and 200 must be secured to the respective pipes 10 and 20 so that during the separation process, clamp 100 does not move in the longitudinal direction L relative to pipe 10, and clamp 150 does not move in the longitudinal direction L relative to pipe 20. As should be evident in the embodiments shown in FIGS. 9–13, the pipes 10 and 20 can also be engaged with each other as well as separated.

Having described the currently preferred embodiments of the present invention, it is to be understood that the invention may be otherwise embodied within the scope of the appended claims.

I claim:

1. A device for moving a first piece relative to a second piece, comprising:

a first clamp adapted to receive the first piece;

a second clamp adapted to receive the second piece, wherein said first clamp includes a first section removably secured to a second section, said first section having a first surface and said second section having a second surface, said first surface and said second surface adapted to coact with the first piece, and said second clamp includes a third section having a third surface and a fourth section having a fourth surface, said third surface and said fourth surface adapted to coact with the second piece, said first surface and said second surface defining a portion of a first passageway for receipt of the first piece and said third surface and said fourth surface defining a portion of a second passageway for receipt of the second piece;

a first fastener removably fastening said first section to said second section, and at least a second fastener removably fastening said third section to said fourth section, wherein said first section is spaced a distance from said second section and said first fastener coacting with said first section and second section, whereby adjusting said first fastener adjusts to a profile of said first passageway and said third section is spaced apart from said fourth section and said second fastener coacting with said third section and said fourth section, whereby adjusting said second fastener adjusts a profile of said second passageway;

a moving member coacting with said first clamp and said second clamp, whereby moving said moving member in a first direction causes said first clamp to move relative to said second clamp causing the first piece to move relative to the second piece, at least one of said first section and second section including a first moving member receiving portion and at least one of said third section and fourth section including a second moving member receiving portion, whereby said moving member is threaded and threadably received by said first moving member receiving portion; and a plug received by said first moving member receiving portion, wherein an end of said moving member is adapted to contact a contacting surface of said plug to urge said first clamp and said second clamp apart.

2. A device for moving a first piece relative to a second piece, comprising:

a first clamp adapted to receive the first piece;

a second clamp adapted to receive the second piece, whereby said first clamp includes a first section removably secured to a second section, said first section having a first surface and said second section having a second surface, said first surface and said second surface adapted to coact with the first piece, and said second clamp includes a third section having a third surface and a fourth section having a fourth surface, said third surface and said fourth surface adapted to coact with the second piece, said first surface and said second surface defining a portion of a first passageway for receipt of the first piece and said third surface and said fourth surface defining a portion of a second passageway for receipt of the second piece;

a first fastener removably fastening said first section to said second section, and at least a second fastener removably fastening said third section to said fourth section, wherein said first section is spaced a distance from said second section and said first fastener coacting with said first section and second section, whereby adjusting said first fastener adjusts to a profile of said first passageway and said third section is spaced apart from said fourth section and said second fastener coacting with said third section and said fourth section, whereby adjusting said second fastener adjusts a profile of said second passageway;

a first threaded bolt comprised of a head and a dreaded shaft and a second threaded bolt comprised of a head and a threaded shaft, said first section of said first clamp further including:

a first threaded bolt receiving portion including a depending tab having a threaded hole for threadably receiving said first threaded bolt therein, and a second threaded bolt receiving portion including a depending tab having a threaded hole for threadably receiving said second threaded bolt therein, said third section of said second clamp further including:

a first contact surface, wherein a contact end of said first threaded bolt is adapted to abut and be urged against said first contact surface; and a second contact surface, wherein a contact end of said second threaded bolt is adapted to abut and be urged against said second contact surface;

a first threaded bolt receiving area, wherein said first threaded bolt receiving area is defined by an area between said depending tab of said first threaded bolt receiving portion and said first contact surface, wherein said head of said first threaded bolt is positioned outside of said first threaded bolt receiving area and a portion of said threaded shaft of said first threaded bolt extends a length of said first threaded bolt receiving area; and a second threaded bolt receiving area, wherein said second threaded bolt receiving area is defined by an area between said depending tab of said second threaded bolt receiving portion and said second contact surface, wherein said head of said second threaded bolt is positioned outside of said second threaded bolt receiving area and a portion of said threaded shaft of said second threaded bolt extends a length of said second threaded bolt receiving area, whereby moving said head of said first threaded bolt in a first direction causes said contact end of said first threaded bolt to abut said first contact surface, and moving said head of said second threaded bolt in a first direction causes said contact end of said second threaded bolt to abut said second contact surface, causing said first clamp to move away from said second clamp causing the first piece to move away from the second piece.

3. The device of claim 2, wherein said first surface, said second surface, said third surface, and said fourth surface comprise a geometric shape, wherein said geometric shape is one of arcuate and a plurality of straight lines.

4. The device of claim 2, wherein said first surface and said second surface comprise gripping members.

5. The device of claim 4, wherein said gripping members comprise teeth.

6. The device of claim 2, wherein said first passageway and said second passageway are one of substantially arcuate shaped and substantially polygonal shaped.

7. The device of claim 6, wherein said polygonal shape is one of a square and a hexagon.

8. The device of claim 2, wherein a driving member is provided on one of said first threaded bolt and said second threaded bolt, wherein said driving member is provided on an intermediate portion of one of said first threaded bolt and said second threaded bolt, intermediate said first clamp, and said second clamp.

9. The device of claim 2, wherein the first piece is a pipe and the second piece is a pipe.

10. The device of claim 9, wherein the first pipe and the second pipe are muffler pipes.

11. A device for moving a first piece relative to a second piece, comprising:

a first clamp adapted to receive the first piece;

a second clamp adapted to receive the second piece, whereby said first clamp includes a first section removably secured to a second section, said first section having a first surface and said second section having a second surface, said first surface and said second surface adapted to coact with the first piece, and said second clamp includes a third section having a third surface and a fourth section having a fourth surface, said third surface and said fourth surface adapted to coact with the second piece, said first surface and said second surface defining a portion of a first passageway for receipt of the first piece and said third surface and said fourth surface defining a portion of a second passageway for receipt of the second piece;

a first fastener removably fastening said first section to said second section, and at least a second fastener removably fastening said third section to said fourth section, wherein said first section is spaced a distance from said second section and said first fastener coacting with said first section and second section, whereby adjusting said first fastener adjusts to a profile of said first passageway and said third section is spaced apart from said fourth section and said second fastener coacting with said third section and said fourth section, whereby adjusting said second fastener adjusts a profile of said second passageway; and a first threaded bolt comprised of a head and a threaded shaft and a second threaded bolt comprised of a head and a threaded shaft, said first section of said first clamp further including:

a first threaded bolt receiving portion including a depending tab having a threaded hole for threadably receiving said first threaded bolt therein, and a second threaded bolt receiving portion including a depending tab having a threaded hole for threadably receiving said second threaded bolt therein, said third section of said second clamp further including:

a first non-threaded bore adapted to receive said first threaded bolt therein; and a second non-threaded bore adapted to receive said second threaded bolt therein;

a first threaded bolt receiving area, wherein said first threaded bolt receiving area is defined by an area between said depending tab of said first threaded bolt receiving portion and said first non-threaded bore, wherein said head of said first threaded bolt is positioned outside of said first threaded bolt receiving area and a portion of said threaded shaft of said first threaded bolt extends a length of said first threaded bolt receiving area; and a second threaded bolt receiving area, wherein said second threaded bolt receiving area is defined by an area between said depending tab of said second threaded bolt receiving portion and said second non-threaded bore, wherein said head of said second threaded bolt is positioned outside of said second threaded bolt receiving area and a portion of said threaded shaft of said second threaded bolt extends a length of said second threaded bolt receiving area.

12. The device of claim 11, wherein the first piece is a pipe and the second piece is a pipe.

13. The device of claim 12, wherein the first pipe and the second pipe are muffler pipes.

* * * * *

UNITED STATES PATENT AND TRADEMARK OFFICE

CERTIFICATE OF CORRECTION

PATENT NO. : 6,775,890 B2
DATED : August 17, 2004
INVENTOR(S) : Kolarik

It is certified that error appears in the above-identified patent and that said Letters Patent is hereby corrected as shown below:

<u>Column 8</u>,
Lines 3-4, “and a dreaded shaft” should read -- and a threaded shaft --

Signed and Sealed this

First Day of February, 2005

JON W. DUDAS
*Director of the United States Patent and Trademark Office*